(No Model.)

F. W. RANDALL.
WHEEL.

No. 270,481. Patented Jan. 9, 1883.

Attest.
John C. Perkins
Phillip Schau

Inventor.
Francis W. Randall
By Lucius C. West.
Atty

UNITED STATES PATENT OFFICE.

FRANCIS W. RANDALL, OF TEKONSHA, ASSIGNOR TO GEO. W. MILLER AND WILLIAM E. HILL, BOTH OF KALAMAZOO, MICHIGAN.

WHEEL.

SPECIFICATION forming part of Letters Patent No. 270,481, dated January 9, 1883.

Application filed September 19, 1882. (No model.)

*To all whom it may concern:*

Be it known that I, FRANCIS W. RANDALL, a citizen of the United States, residing at Tekonsha, county of Calhoun, State of Michigan, have invented a new and useful Wheel, of which the following is a specification.

The object of my invention is to construct a wheel for use on such devices as require wheels of light weight.

A further object is to construct a wheel especially adapted for use on railway velocipedes.

Figure 1:
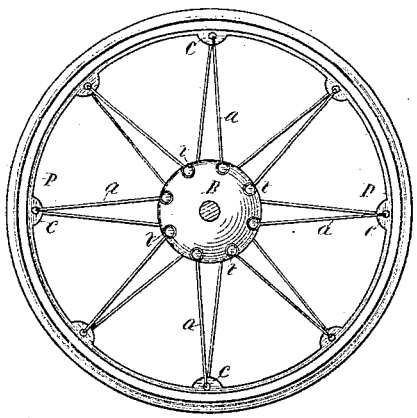
Figure 2:
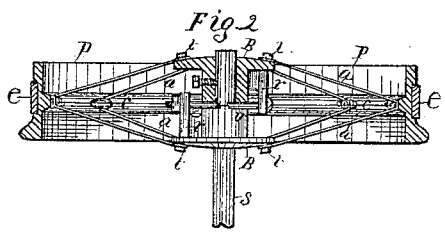
Figure 3:
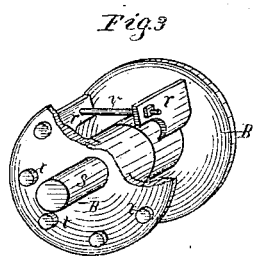
Figure 4:
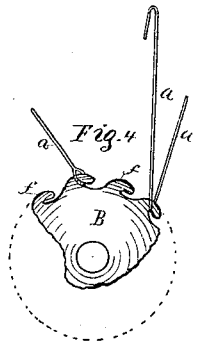

In the drawings, forming a part of this specification, Figure 1 is a side view of the wheel; Fig. 2, a cross-section intercepting the axis, with a portion of hub left full; Fig. 3, hub in perspective, and Fig. 4 shows an equivalent variation in the construction of a portion of the hub.

P shows the rim of the wheel, made of light weight. The periphery is here shown provided with a flange, like a car-weeel; but the wheel may be made with any peculiar exterior desired, adapting it for the especial use intended. The hub is made in two parts, with disk or flanged ends B B, Fig. 3.

S illustrates an axle located through the hub-sections. The disks B B are provided with lugs $t\ t$, with which the spokes $a\ a$ are connected. An equivalent to lugs $t\ t$ is shown in Fig. 4 at $f\ f$, the same being hooks around the edge of the flange B. On the inner face of rim P are perforated lugs $c\ c$. The spokes $a\ a$ are connected with the rim by passing through these lugs, or by other practical means. Said spokes are made of small rods or wires bent back upon themselves, somewhat like a hair-pin, and provided at the ends with eyes, which are located over lugs $t\ t$ or their equivalents. If preferred, a single wire may be woven around the wheel between the rim and hub by hooking it over and through the connecting means, similar as at $a'\ a'$, Fig. 4. On the inner face of disks B B are extensions $r$—one or more on each—Figs. 2 and 3. Said extensions are perforated, and provided with a bolt, $v$, and nut, constituting a tension-lock. By turning up the nut on bolt $v$ the hub-sections are revolved slightly in opposite directions, bringing a tight fixed tension on the spoke-wire, and effectually securing the hub in the wheel-rim. If one hub-section is secured to the axle by set-screw, Fig. 2, or by other means, of course only one hub-section would then turn when tightening the bolt $v$; but the same tension would be produced. A like tension can be exerted on the spokes by locating bolts from one disk B to another diagonally across the hub, said arrangement not being here shown.

To especially adapt the wheel for more practical use on metal rails of a rail track or way, I form a recess around the periphery of the wheel-rim, in which is located a rubber band or tire, $e$, Fig. 2, said band being allowed to extend a little beyond the outer face of the rim. This causes the wheel to run stiller and with less jarring when running over uneven surfaces.

Having thus described my invention, what I claim as new, and desire to secure by Letters Patent, is—

The combination, with the wheel-rim and wire spokes, of the hub-sections having the flanged ends provided with the perforated extensions, and the locking-bolt, substantially as specified and shown.

FRANCIS W. RANDALL.

Witnesses:
CHARLES RANDALL,
GEORGE GARSIDE.